United States Patent
Shi (10) Patent No.: US 11,381,991 B2
(45) Date of Patent: Jul. 5, 2022

(54) MEASURING METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 160 days.

(21) Appl. No.: 16/899,009

(22) Filed: Jun. 11, 2020

(65) Prior Publication Data

US 2020/0305016 A1 Sep. 24, 2020

Related U.S. Application Data (63) Continuation of application No. PCT/CN2017/117271, filed on Dec. 19, 2017.

(51) Int. Cl.
*H04W 24/10* (2009.01)
*H04L 5/00* (2006.01)
(Continued)

(52) U.S. Cl.
CPC .......... *H04W 24/10* (2013.01); *H04L 5/0048* (2013.01); *H04W 16/14* (2013.01); *H04W 48/10* (2013.01)

(58) Field of Classification Search
CPC ............................ H04W 24/10; H04L 5/0048
See application file for complete search history.

(56) References Cited

U.S. PATENT DOCUMENTS

2016/0100404 A1  4/2016 Han et al.
2016/0227571 A1  8/2016 Baek et al.
(Continued)

FOREIGN PATENT DOCUMENTS

CN   104333873 A   2/2015
CN   104579518 A   4/2015
(Continued)

OTHER PUBLICATIONS

Communication pursuant to Article 94(3) EPC for EP Application 17935420.4 dated Oct. 13, 2021. (4 pages).
(Continued)

*Primary Examiner* — Zhiren Qin
(74) *Attorney, Agent, or Firm* — Young Basile Hanlon & MacFarlane, P.C.

(57) ABSTRACT

Provided are a measuring method, a network device, and a terminal device. The method is applied to a 5G communication system. The method comprises: a network device sending measurement configuration information to a terminal device, the measurement configuration information comprising configuration information concerning a plurality of sending opportunities for a first reference signal on an unlicensed frequency band; the network device sending, on the plurality of sending opportunities, the first reference signal to the terminal device. According to the measuring method provided in the embodiments of the present invention, the network device configures the terminal device with the measurement configuration information, such that a 5G terminal device on an unlicensed frequency band can measure a received reference signal.

18 Claims, 4 Drawing Sheets

(51) Int. Cl.
*H04W 16/14* (2009.01)
*H04W 48/10* (2009.01)

(56) References Cited

U.S. PATENT DOCUMENTS

| | | | |
|---|---|---|---|
| 2017/0048690 A1* | 2/2017 | Yang | H04W 16/14 |
| 2017/0238320 A1* | 8/2017 | Fukuta | H04W 16/14 370/329 |
| 2017/0245168 A1* | 8/2017 | Yi | H04W 24/08 |
| 2017/0359733 A1* | 12/2017 | Yamazaki | H04B 17/345 |
| 2018/0007708 A1* | 1/2018 | Ke | H04L 5/0062 |
| 2018/0062806 A1* | 3/2018 | Jung | H04L 5/0091 |
| 2018/0084432 A1* | 3/2018 | Kwak | H04W 74/0825 |
| 2018/0227106 A1* | 8/2018 | Kim | H04W 72/1289 |
| 2018/0242183 A1* | 8/2018 | Bergström | H04L 5/001 |
| 2019/0053235 A1* | 2/2019 | Novlan | H04L 43/0876 |
| 2020/0068378 A1* | 2/2020 | Lun | H04L 47/27 |
| 2021/0297867 A1* | 9/2021 | Niu | H04L 5/0051 |
| 2021/0400690 A1* | 12/2021 | Novak | H04L 5/0069 |

FOREIGN PATENT DOCUMENTS

| | | |
|---|---|---|
| CN | 106992804 A | 7/2017 |
| EP | 3258721 A1 | 12/2017 |
| WO | 2016119562 A1 | 8/2016 |
| WO | 2017052457 A1 | 3/2017 |

OTHER PUBLICATIONS

3GPP TSG-RAN WG2 Meeting #89bis;R2-151349; Bratislava, Slovakia, Apr. 20-24, 2015.
International Search Report for PCT/CN2017/117271 dated Sep. 6, 2018.
Communication pursuant to Article 94(3) EPC for EP Application 17935420.4 dated May 14, 2021. (6 pages).
3GPP TSG-RAN WG2 #90; Fukuoka, Japan, May 25 to May 29, 2015; R2-152480.
Extended European Search Report for EP Application 17935420.4 dated Nov. 3, 2020.
3GPP TS 36.331 V11.8.0 (Jun. 2014); 3rd Generation Partnership Project; Technical Specification Group Radio Access Network; Evolved Universal Terrestrial Radio Access (E-UTRA); Radio Resource Control (RRC); Protocol specification (Release 11).

* cited by examiner

MEASURING METHOD, NETWORK DEVICE, AND TERMINAL DEVICE

CROSS-REFERENCE TO RELATED APPLICATION(S)

This application is a continuation application of International PCT Application No. PCT/CN2017/117271, filed on Dec. 19, 2017, the entire content of which is hereby incorporated by reference.

TECHNICAL FIELD

Implementations of the present disclosure relate to the communication field, and more particularly, to a measuring method, a network device and a terminal device.

BACKGROUND

The 3rd Generation Partnership Project (3GPP) Long Term Evolution (LTE) has introduced Licensed-Assisted Access (LAA) technology. For example, based on a framework of carrier aggregation (CA), 5G (5-Generation) mobile communication technology New Radio (NR) will also make full use of an unlicensed frequency band to provide a higher rate.

In the prior art, a primary cell (PCell) under LTE works in a licensed frequency band while a secondary cell (SCell) works in an unlicensed frequency band, that is, only the SCell can work in an unlicensed frequency band, and the PCell cannot work in an unlicensed frequency band. While, in the 5G NR, both the PCell and the SCell can work in an unlicensed frequency band.

However, when a base station sends a reference signal (e.g., SSB and CSI-RS) on an unlicensed frequency band, it may encounter a situation where a failure of listen before talk (LBT) occurs and the reference signal cannot be sent. In this case, how the UE measures these reference signals and reports to a base station is a problem urgently to be solved.

SUMMARY

Provided are a measuring method, a network device and a terminal device, by which a 5G terminal device on an unlicensed frequency band is enabled to perform measurement on received reference signals.

In a first aspect, there is provided a measuring method, applied to a 5G communication system. The method includes: sending, by a network device, measurement configuration information to a terminal device, wherein the measurement configuration information includes configuration information of multiple transmission opportunities of a first reference signal on an unlicensed frequency band; and sending, by the network device, the first reference signal to the terminal device on the multiple transmission opportunities.

An implementation of the present disclosure provides a measuring method in which measurement configuration information is configured for a terminal device through a network device so that the 5G terminal device on an unlicensed frequency band can perform measurement on received reference signals.

In some possible implementation modes, the multiple transmission opportunities belong to a same time window, and the configuration information includes configuration information of the multiple transmission opportunities within the time window; wherein sending, by the network device, the first reference signal to the terminal device on the multiple transmission opportunities, includes: sending, by the network device, the first reference signal to the terminal device on the multiple transmission opportunities within the same time window by Listen Before Talk.

In some possible implementation modes, before sending, by the network device, the measurement configuration information to the terminal device, the method further includes: sending, by the network device, mapping relationship information to the terminal device, wherein the mapping relationship information includes at least one reference signal type and information about a time window corresponding to the at least one reference signal type, and the at least one reference signal type includes a type of the first reference signal.

In some possible implementation modes, the information about the time window includes a start position of the time window and/or an end position of the time window.

In some possible implementation modes, the measurement configuration information includes multiple offset values of a fixed time position; wherein sending, by the network device, the first reference signal to the terminal device on the multiple transmission opportunities, includes: sending, by the network device, the first reference signal to the terminal device on the multiple transmission opportunities determined according to the multiple offset values.

In some possible implementation modes, sending, by the network device, the measurement configuration information to the terminal device, includes: sending, by the network device, system information to the terminal device, wherein the system information includes the measurement configuration information.

In some possible implementation modes, sending, by the network device, the measurement configuration information to the terminal device, includes: sending, by the network device, Radio Resource Control (RRC) signaling to the terminal device, wherein the RRC signaling includes the measurement configuration information.

In some possible implementation modes, the first reference signal is a Synchronization Signal Block (SSB) or a Channel State Information Measurement Reference Signal (CSI-RS).

In some possible implementation modes, the method further includes: receiving, by the network device, reporting information sent by the terminal device, wherein the reporting information includes indication information and cell quality acquired by the terminal device based on the first reference signal, and the indication information is used for indicating that the cell quality reported by the terminal device is cell quality acquired after the terminal device takes missing of a sampling value into account.

In a second aspect, there is provided a measuring method, applied to a 5G communication system. The method includes: receiving, by a terminal device, measurement configuration information sent by a network device, wherein the measurement configuration information includes configuration information of multiple transmission opportunities of a first reference signal on an unlicensed frequency band; receiving, by the terminal device, the first reference signal on the multiple transmission opportunities and performing measurement on the first reference signal according to the configuration information; and determining, by the terminal device, cell quality according to a measurement value of the first reference signal received on the multiple transmission opportunities.

In some possible implementation modes, determining, by the terminal device, the cell quality according to the measurement value of the first reference signal received on the multiple transmission opportunities, includes: determining, by the terminal device, a measurement value of the first reference signal received on a second transmission opportunity as a measurement value of the first reference signal on a first transmission opportunity when the terminal device does not receive the first reference signal on the first transmission opportunity of the multiple transmission opportunities, wherein the second transmission opportunity is before the first transmission opportunity.

In some possible implementation modes, the multiple transmission opportunities belong to the same time window, and the configuration information includes configuration information of the multiple transmission opportunities within the time window.

In some possible implementation modes, before receiving, by the terminal device, the measurement configuration information sent by the network device, the method further includes: receiving, by the terminal device, mapping relationship information sent by the network device, wherein the mapping relationship information includes at least one reference signal type and information about a time window corresponding to the at least one reference signal type, and the at least one reference signal type includes a type of the first reference signal; determining, by the terminal device, a time window corresponding to the first reference signal according to the mapping relationship information and the type of the first reference signal; wherein receiving, by the terminal device, the first reference signal on the multiple transmission opportunities and performing measurement on the first reference signal according to the configuration information, includes: according to the configuration information, receiving, by the terminal device, the first reference signal on the multiple transmission opportunities within a time window corresponding to the first reference signal and performing measurement on the first reference signal.

In some possible implementation modes, the information about the time window includes a start position of the time window and/or an end position of the time window.

In some possible implementation modes, the measurement configuration information includes multiple offset values of a fixed time position; wherein receiving, by the terminal device, the first reference signal on the multiple transmission opportunities and performing measurement on the first reference signal according to the configuration information includes: receiving, by the terminal device, the first reference signal sent by the network device on the multiple transmission opportunities determined according to the multiple offset values.

In some possible implementation modes, receiving, by the terminal device, the measurement configuration information sent by the network device includes: receiving, by the terminal device, system information sent by the network device, wherein the system information includes the measurement configuration information.

In some possible implementation modes, receiving, by the terminal device, the measurement configuration information sent by the network device includes: receiving, by the terminal device, radio resource control (RRC) signaling sent by the network device, wherein the RRC signaling includes the measurement configuration information.

In some possible implementation modes, the first reference signal is a Synchronization Signal Block (SSB) or a Channel State Information Measurement Reference Signal (CSI-RS).

In some possible implementation modes, the method further includes: sending, by the terminal device, reporting information to the network device, wherein the reporting information includes indication information and cell quality acquired by the terminal device based on the first reference signal, and the indication information is used for indicating that the cell quality reported by the terminal device is cell quality acquired after the terminal device takes missing of a sampling value into account.

In some possible implementation modes, determining, by the terminal device, the cell quality according to the measurement value of the first reference signal received on the multiple transmission opportunities, includes: determining, by the terminal device, the cell quality according to the following formula:

$$F_n=(1-a)*F_{n-1}+aM_n$$

wherein n represents a number of samplings, $F_n$ represents cell quality, $M_n$ represents a measurement value, and a represents a weighting coefficient.

In a third aspect, there is provided a network device, applied to a 5G communication system. The network device includes a sending unit. The sending unit is configured to send measurement configuration information to a terminal device, wherein the measurement configuration information includes configuration information of multiple transmission opportunities of a first reference signal on an unlicensed frequency band; and send the first reference signal to the terminal device on the multiple transmission opportunities.

In a fourth aspect, there is provided a terminal device, applied to a 5G communication system. The terminal device includes a transceiving unit and a processing unit.

The transceiving unit is configured to receive measurement configuration information sent by a network device, wherein the measurement configuration information includes configuration information of multiple transmission opportunities of a first reference signal on an unlicensed frequency band.

The processing unit is configured to control the transceiving unit to receive the first reference signal on the multiple transmission opportunities and perform measurement on the first reference signal according to the configuration information, and further configured to determine cell quality according to a measurement value of the first reference signal received on the multiple transmission opportunities.

In a fifth aspect, there is provided a network device, applied to a 5G communication system. The network device includes a transceiver configured to send measurement configuration information to a terminal device, wherein the measurement configuration information includes configuration information of multiple transmission opportunities of a first reference signal on an unlicensed frequency band; and send the first reference signal to the terminal device on the multiple transmission opportunities.

In a sixth aspect, there is provided a terminal device, applied to a 5G communication system. The terminal device includes a transceiver and a processor.

The transceiver is configured to receive measurement configuration information sent by a network device, wherein the measurement configuration information includes configuration information of multiple transmission opportunities of a first reference signal on an unlicensed frequency band.

The processor is configured to control the transceiver to receive the first reference signal on the multiple transmission opportunities and perform measurement on the first reference signal according to the configuration information, and further configured to determine cell quality according to a measurement value of the first reference signal received on the multiple transmission opportunities.

In a seventh aspect, there is provided a computer readable medium for storing a computer program. The computer program includes instructions used for executing the method implementations of the above first aspect or the second aspect.

In an eighth aspect, there is provided a computer chip. The computer chip includes an input interface, an output interface, at least one processor, and a memory. The processor is used for executing codes in the memory. When the codes are executed, the processor may implement various processes executed by the network device in the measuring method of the first aspect or the second aspect.

In a ninth aspect, there is provided a computer chip. The computer chip includes an input interface, an output interface, at least one processor, and a memory. The processor is used for executing codes in the memory. When the codes are executed, the processor may implement various processes executed by the terminal device in the measuring method of the first aspect or the second aspect.

In a tenth aspect, there is provided a communication system including the aforementioned network device and terminal device.

DETAILED DESCRIPTION

Figure 1:
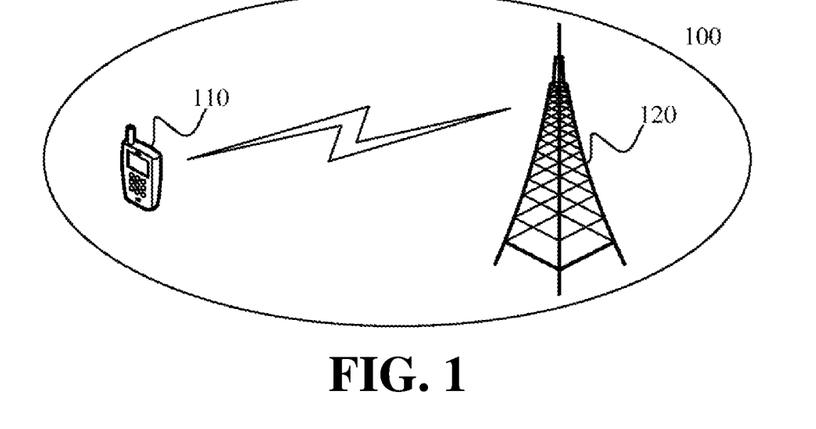
FIG. 1 is an example of an application scenario of the present disclosure.

FIG. 1 is a schematic diagram of a 5G application scenario according to an implementation of the present disclosure.

As shown in FIG. 1, a communication system 100 may include a terminal device 110 and a network device 120. The network device 120 may communicate with the terminal device 110 via an air interface. Multi-service transmission is supported between the terminal device 110 and the network device 120.

It should be understood that the 5G communication system 100 is an example implementation of the present disclosure. However, implementations of the present disclosure are not limited thereto. That is, the technical solution of the implementation of the present disclosure may be applied to various scenarios including a 5G communication system, for example, a hybrid deployment scenario consisting of a 5G communication system and a first communication system. The first communication system may be any communication system, for example, a Long Term Evolution (LTE) system, an LTE Time Division Duplex (TDD) system, a Universal Mobile Telecommunication System (UMTS).

Furthermore, in the present disclosure, various implementations are described in combination with a network device and a terminal device.

The network device 120 may refer to any entity on a network side for sending or receiving signals, for example, a base station device in a 5G network.

The terminal device 110 may be any terminal device. Specifically, the terminal device 110 may communicate with one or more core networks through a radio access network (RAN), and it may also be referred to as an access terminal, a User Equipment (UE), a subscriber unit, a subscriber station, a mobile station, a rover station, a remote station, a remote terminal, a mobile device, a user terminal, a terminal, a wireless communication device, a user agent, or a user device. For example, the terminal device 110 may be a cellular phone, a cordless phone, a Session Initiation Protocol (SIP) phone, a Wireless Local Loop (WLL) station, a Personal Digital Assistant (PDA), a handheld device with a radio communication function, a computing device, or other processing devices connected to a wireless modem, a vehicle-mounted device, a wearable device, etc.

However, for the above scenario, a primary cell (PCell) under the first communication system may not operate on an unlicensed frequency band (e.g., LTE). In 5G NR, both a PCell and a secondary cell (SCell) may work in an unlicensed frequency band. When a base station sends a reference signal (e.g., SSB and CSI-RS) on an unlicensed frequency band, the base station may possibly not send the reference signal due to a failure of listen before talk (LBT). In this case, how the UE measures these reference signals and reports to the base station needs to be solved.

To solve the above-mentioned technical problems, an implementation of the present disclosure provides a measuring method in which measurement configuration information is configured for a terminal device through a network device so that the 5G terminal device on an unlicensed frequency band can perform measurement on received reference signals.

Figure 2:
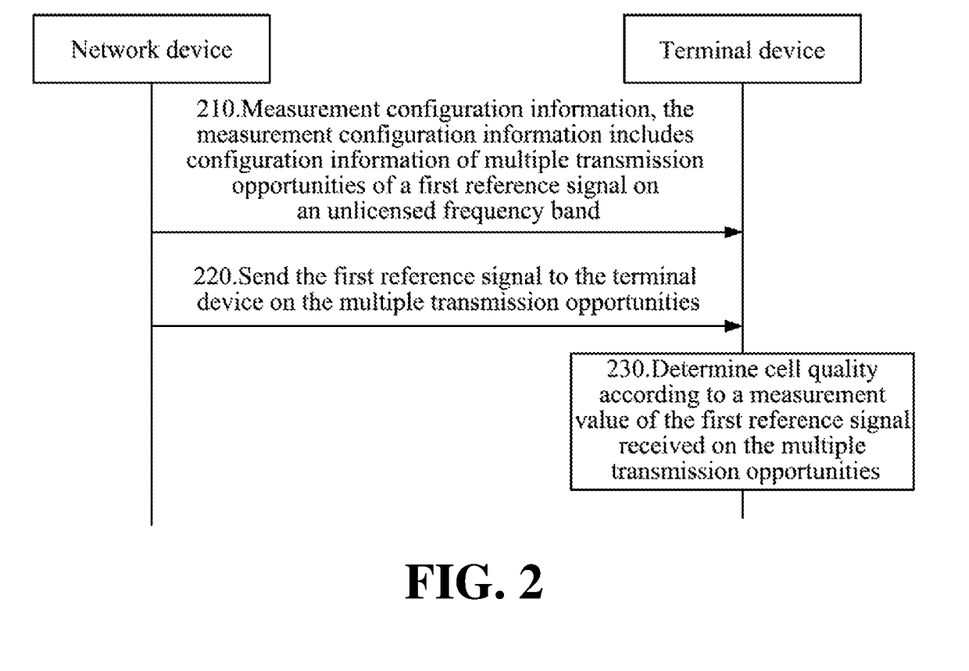
FIG. 2 is a schematic flowchart of a measuring method according to an implementation of the present disclosure.

FIG. 2 is a schematic flowchart of a measuring method according to an implementation of the present disclosure.

Specifically, as shown in FIG. 2, the method includes the following acts.

In 210, a network device sends measurement configuration information to a terminal device, wherein the measurement configuration information includes configuration information of multiple transmission opportunities of a first reference signal on an unlicensed frequency band.

In 220, the network device sends the first reference signal to the terminal device on the multiple transmission opportunities.

In 230, the terminal device determines cell quality according to a measurement value of the first reference signal received on the multiple transmission opportunities.

In short, the network device sends measurement configuration information to the terminal device and sends the first reference signal to the terminal device according to the measurement configuration information.

It should be understood that the multiple transmission opportunities in an implementation of the present disclosure are possible transmission opportunities, configured by the network device for the terminal device, for sending the first reference signal, and whether the network device sends the first reference signal to the terminal device on the multiple transmission opportunities is not restricted specifically in implementations of the present disclosure. That is, the network device may send the first reference signal to the terminal device on each of the multiple transmission opportunities, or may send the first reference signal to the terminal device on some of the multiple transmission opportunities, or may not send the first reference signal to the terminal device on the multiple transmission opportunities. Specifically, whether to send may be determined according to a sending mode of the first reference signal, or whether to send may also be determined according to an idle state of the channel, and this is not specifically restricted in implementations of the present disclosure.

In other words, the terminal device receives the measurement configuration information sent by the network device; according to the configuration information, the terminal device receives the first reference signal on the multiple transmission opportunities and performs measurement on the first reference signal; and the terminal device determines cell quality according to the measurement value of the first reference signal received on the multiple transmission opportunities.

More specifically, the terminal device may determine the cell quality according to the following formula:

$$F_n=(1-a)*F_{n-1}+aM_n$$

Wherein n represents the number of samplings, $F_n$ represents cell quality, $M_n$ represents a measurement value, and a represents a weighting coefficient.

Since the network device may not send the first reference signal to the terminal device on some or all of the multiple transmission opportunities, it is likely that the terminal device may not measure a certain reference signal. Therefore, for an estimation of cell quality, missing of some sampling values also needs to be taken into account due to missing of the reference signal.

In an implementation of the present disclosure, when a sampling value is missed and the cell quality is calculated with the above formula, the sampling times are not increased by 1, that is, the missed sampling value is skipped. For example, the terminal device may determine a measurement value of the first reference signal received on a second transmission opportunity as a measurement value of the first reference signal on a first transmission opportunity when the terminal device does not receive the first reference signal on the first transmission opportunity of the multiple transmission opportunities, wherein the second transmission opportunity is before the first transmission opportunity.

That is, in an implementation of the present disclosure, when the terminal device determines the cell quality, the accuracy of the cell quality can effectively be improved by taking missing of sampling values into account.

It should be understood that in an implementation of the present disclosure, a specific form of the measurement configuration information is not restricted, and the following is an example explanation.

Figure 3:
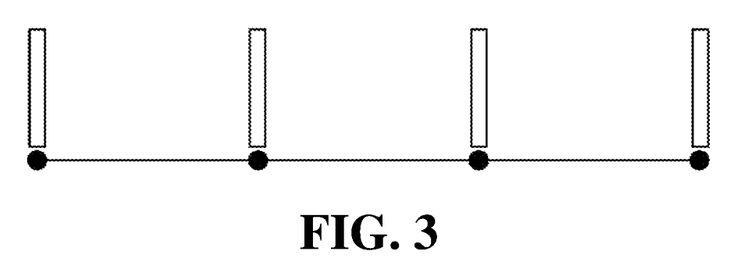
FIG. 3 is a schematic diagram of multiple transmission opportunities according to an implementation of the present disclosure.

In an implementation, as shown in FIG. 3, multiple transmission opportunities of the first reference signal may be directly configured for the terminal device through the measurement configuration information, that is, the terminal device may wait to receive the first reference signal on the multiple transmission opportunities.

For example, the measurement configuration information may include multiple offset values of a fixed time position. That is, the network device sends the first reference signal to the terminal device on the multiple transmission opportunities determined according to the multiple offset values. Correspondingly, the terminal device receives the first reference signal sent by the network device only on the multiple transmission opportunities determined according to the multiple offset values.

Figure 4:
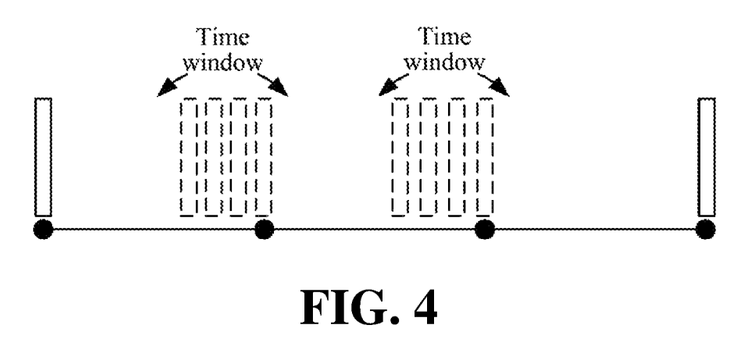
FIG. 4 is a schematic diagram of a time window according to an implementation of the present disclosure.

In another implementation, as shown in FIG. 4, the multiple transmission opportunities may belong to the same time window, and the configuration information includes configuration information of the multiple transmission opportunities within the time window. That is, the network device sends the first reference signal to the terminal device on the multiple transmission opportunities within the same time window by Listen Before Talk. Accordingly, the terminal device needs to receive the first reference signal which is possibly sent by the network device within this time window.

In an implementation of the present disclosure, Listen Before Talk (LBT) may be understood as that a station which is to transmit data first monitors whether there is a carrier on a medium to determine whether other stations are transmitting data. If the medium is idle, the station may transmit data. Otherwise, there will be an avoidance for transmission for a while, and then the station will try to transmit the data.

Optionally, before the network device sends the measurement configuration information to the terminal device, the network device may send mapping relationship information to the terminal device, wherein the mapping relationship information includes at least one reference signal type and information about a time window corresponding to the at least one reference signal type, and the at least one reference signal type includes a type of the first reference signal. In other words, the terminal device may receive the mapping relationship information sent by the network device before receiving the measurement configuration information, and the terminal device determines a time window corresponding to the first reference signal according to the mapping relationship information and the type of the first reference signal; according to the configuration information, the terminal device receives the first reference signal on the multiple transmission opportunities within the time window corresponding to the first reference signal and performs measurement on the first reference signal.

Further, the information about the time window includes a start position of the time window and/or an end position of the time window.

It should be understood that in an implementation of the present disclosure, there is no specific limitation on a manner by which the network device sends measurement configuration information to the terminal device.

For example, the network device may send system information to the terminal device, the system information includes the measurement configuration information.

For another example, the network device may send Radio Resource Control (RRC) signaling to the terminal device, the RRC signaling includes the measurement configuration information.

It should further be understood that in an implementation of the present disclosure, there is no specific limitation on the type of the first reference signal, for example, the first reference signal is a Synchronization Signal Block (SSB) or a Channel State Information Reference Signal (CSI-RS).

Furthermore, in an implementation of the present disclosure, there also provides a method for a terminal device to report cell quality. Specifically, the terminal device sends reporting information to the network device, the reporting information includes indication information and cell quality acquired by the terminal device based on the first reference signal, and the indication information is used for indicating that the cell quality reported by the terminal device is cell quality acquired after the terminal device takes missing of a sampling value into account. For the network device, the network device receives the reporting information sent by the terminal device, and determines, based on the reporting information, the cell quality reported by the terminal device as the cell quality acquired after the terminal device takes missing of a sampling value into account.

Figure 5:
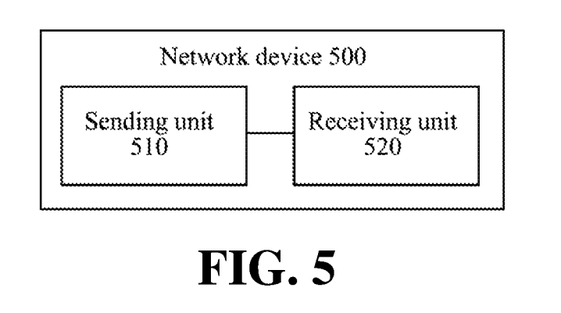
FIG. 5 is a schematic block diagram of a network device according to an implementation of the present disclosure.

FIG. 5 is a schematic block diagram of a network device according to an implementation of the present disclosure. It should be understood that the network device in an implementation of the present disclosure may be applied to a 5G communication system, i.e., a 5G network device or 5G network element.

Specifically, as shown in FIG. 5, the terminal device 500 includes a sending unit 510.

The sending unit 510 is configured to send measurement configuration information to a terminal device, wherein the measurement configuration information includes configuration information of multiple transmission opportunities of a first reference signal on an unlicensed frequency band; and send the first reference signal to the terminal device on the multiple transmission opportunities.

Optionally, the multiple transmission opportunities belong to the same time window, and the configuration information includes configuration information of the multiple transmission opportunities within the time window; and the sending unit 510 is specifically configured to send the first reference signal to the terminal device on the multiple transmission opportunities within the same time window by Listen Before Talk.

Optionally, the sending unit 510 is further configured to send mapping relationship information to the terminal device before sending the measurement configuration information to the terminal device, wherein the mapping relationship information includes at least one reference signal type and information about a time window corresponding to the at least one reference signal type, and the at least one reference signal type includes a type of the first reference signal.

Optionally, the information about the time window includes a start position of the time window and/or an end position of the time window.

Optionally, the measurement configuration information includes multiple offset values of a fixed time position; and the sending unit 510 is specifically configured to send the first reference signal to the terminal device on the multiple transmission opportunities determined according to the multiple offset values.

Optionally, the sending unit 510 is specifically configured to send system information to the terminal device, wherein the system information includes the measurement configuration information.

Optionally, the sending unit 510 is specifically configured to send radio resource control (RRC) signaling to the terminal device, wherein the RRC signaling includes the measurement configuration information.

Optionally, the first reference signal is a Synchronization Signal Block (SSB) or a Channel State Information Measurement Reference Signal (CSI-RS).

Optionally, the network device further includes a receiving unit 520.

The receiving unit 520 is configured to receive reporting information sent by the terminal device, wherein the reporting information includes indication information and cell quality acquired by the terminal device based on the first reference signal, and the indication information is used for indicating that the cell quality reported by the terminal device is cell quality acquired after the terminal device takes missing of a sampling value into account.

It should be noted that both the sending unit 510 and the receiving unit 520 may be implemented by a transceiver.

Figure 6:
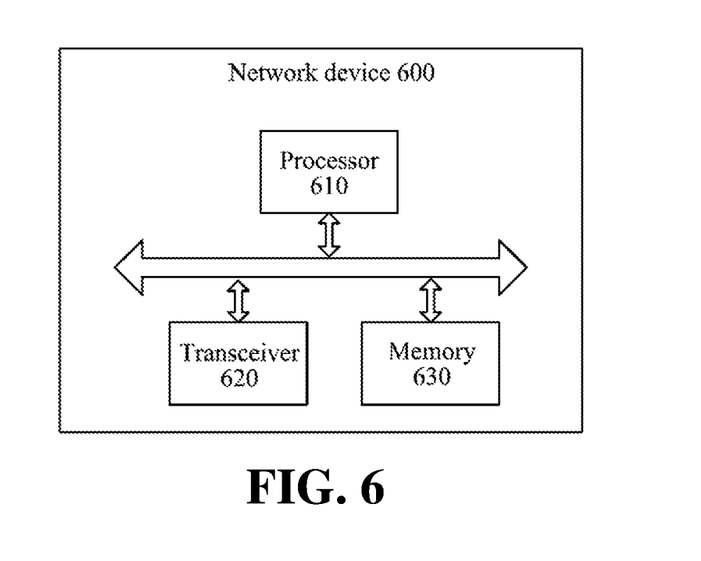
FIG. 6 is a schematic block diagram of another network device according to an implementation of the present disclosure.

As shown in FIG. 6, a network device 600 may include a processor 610, a transceiver 620, and a memory 630. The memory 630 may be configured to store indication information, or may be configured to store codes, instructions, etc., executed by the processor 610. The various components in the network device 600 are connected by a bus system. The bus system includes a power bus, a control bus and a status signal bus in addition to a data bus.

The network device 600 shown in FIG. 6 may implement the various processes implemented by the network device in the method implementation of FIG. 2 described above. In order to avoid duplication, the details will not be repeated here.

Figure 7:
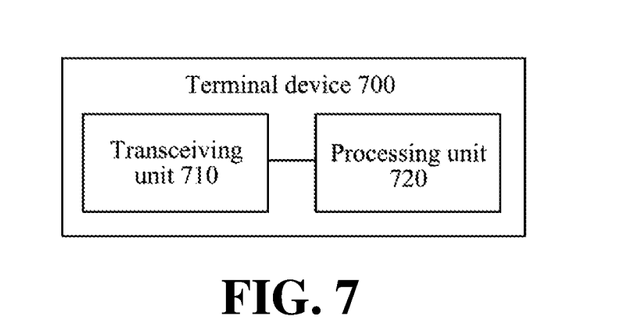
FIG. 7 is a schematic block diagram of a terminal device according to an implementation of the present disclosure.

FIG. 7 is a schematic block diagram of a terminal device according to an implementation of the present disclosure. It should be understood that the terminal device in an implementation of the present disclosure may be applied to a 5G communication systems, i.e., a 5G terminal.

Specifically, as shown in FIG. 5, the terminal device 700 includes a transceiving unit 710 and a processing unit 720.

The transceiving unit 710 is configured to receive measurement configuration information sent by a network device, wherein the measurement configuration information includes configuration information of multiple transmission opportunities of a first reference signal on an unlicensed frequency band.

The processing unit 720 is configured to control the transceiving unit 710 to receive the first reference signal on the multiple transmission opportunities and perform measurement on the first reference signal according to the configuration information, and further configured to determine cell quality according to a measurement value of the first reference signal received on the multiple transmission opportunities.

Optionally, the processing unit 720 is specifically configured to determine a measurement value of the first reference signal received on a second transmission opportunity as a measurement value of the first reference signal on a first transmission opportunity when the first reference signal is not received on the first transmission opportunity of the multiple transmission opportunities, wherein the second transmission opportunity is before the first transmission opportunity.

Optionally, the multiple transmission opportunities belong to the same time window, and the configuration information includes configuration information of the multiple transmission opportunities within the time window.

Optionally, the transceiving unit 710 is further configured to receive mapping relationship information sent by the network device before receiving the measurement configuration information sent by the network device, wherein the mapping relationship information includes at least one reference signal type and information about a time window corresponding to the at least one reference signal type, and the at least one reference signal type includes a type of the first reference signal.

The processing unit 720 is specifically configured to determine a time window corresponding to the first reference signal according to the mapping relationship information and the type of the first reference signal; and according to the configuration information, control the transceiving unit 710 to receive the first reference signal on the multiple transmission opportunities within the time window corresponding to the first reference signal and perform measurement on the first reference signal.

Optionally, the information about the time window includes a start position of the time window and/or an end position of the time window.

Optionally, the measurement configuration information includes multiple offset values of a fixed time position; and the processing unit 720 is specifically configured to control the transceiving unit 710 to receive the first reference signal sent by the network device on the multiple transmission opportunities determined according to the multiple offset values.

Optionally, the transceiving unit 710 is specifically configured to receive system information sent by the network device, wherein the system information includes the measurement configuration information.

Optionally, the transceiving unit 710 is specifically configured to receive radio resource control (RRC) signaling sent by the network device, wherein the RRC signaling includes the measurement configuration information.

Optionally, the first reference signal is a Synchronization Signal Block (SSB) or a Channel State Information Measurement Reference Signal (CSI-RS).

Optionally, the transceiving unit 710 is further configured to send reporting information to the network device, wherein the reporting information includes indication information and cell quality acquired by the terminal device based on the first reference signal, and the indication information is used for indicating that the cell quality reported by the terminal device is cell quality acquired after the terminal device takes missing of a sampling value into account.

Optionally, the processing unit 720 is further specifically configured to determine the cell quality according to the following formula:

$$F_n = (1-a)*F_{n-1} + aM_n$$

wherein n represents the number of samplings, $F_n$ represents cell quality, $M_n$ represents a measurement value, and a represents a weighting coefficient.

Figure 8:
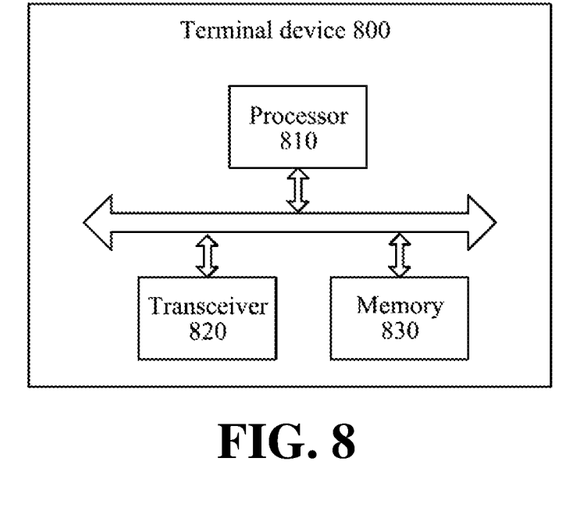
FIG. 8 is a schematic block diagram of another terminal device according to an implementation of the present disclosure.

It should be noted that the transceiving unit 710 may be implemented by a transceiver, and the processing unit 720 may be implemented by a processor. As shown in FIG. 8, a terminal device 800 may include a processor 810, a transceiver 820, and a memory 830. The memory 830 may be configured to store indication information, or may be configured to store codes, instructions, etc., executed by the processor 810. The various components in the terminal device 800 are connected by a bus system. The bus system includes a power bus, a control bus and a status signal bus in addition to a data bus.

The terminal device 800 shown in FIG. 8 may implement the various processes implemented by the terminal device in the method implementation of FIG. 2 described above. In order to avoid duplication, the details will not be repeated here.

It should also be understood that the method implementations in implementations of the present disclosure may be applied to a processor or implemented by the processor. Specially, it can be understood that in the implementation process, each act of the method implementations in the implementations of the present disclosure may be completed by an integrated logic circuit of hardware in the processor or instructions in the form of software. More specifically, the acts of the method disclosed in connection with the implementations of the present disclosure may be directly embodied as completion through the execution of a hardware decoding processor or completion through the execution in the combination of hardware and software modules in the decoding processor. Software modules may be located in a typical storage medium in the art, such as, a random access memory (RAM), a flash memory, a read-only memory, a programmable read-only memory, an electrical erasable programmable memory, or a register. The storage medium is located in the memory, and the processor reads the information in the memory and completes the actions of the above method in combination with its hardware.

Herein, the processor may be an integrated circuit chip with a capability of signal processing, and may implement various methods, acts and logic block diagrams disclosed in the implementations of the present disclosure. For example, the above processor may be a general purpose processor, a digital signal processor (DSP), an application specific integrated circuit (ASIC), a field programmable gate array (FPGA) or other programmable logic devices, a transistor logic device, or a discrete hardware component, or the like. Furthermore, the general purpose processor may be a microprocessor or the processor may be any conventional processor or the like.

In addition, the memory in implementations of the present disclosure may be a transitory memory or non-transitory memory, or may include both the transitory memory and the non-transitory memory. The non-transitory memory may be a read-only memory (ROM), a programmable ROM (PROM), an erasable PROM (EPROM), an electrically erasable EPROM (EEPROM), or a flash memory. The transitory memory may be a Random Access Memory (RAM) which serves as an external cache. It should be understood that, the foregoing memory is an example for illustration and should not be construed as limiting. For example, the memory in the implementations of the present disclosure may also be a Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DR RAM), or the like. That is, memories in the systems and methods described herein are intended to include, but are not limited to, these and any other suitable types of memories.

Finally, it should be noted that the terms used in the implementations of the present disclosure and the appended claims are for the purpose of describing specific implementations only and are not intended to limit the implementations of the present disclosure.

For example, the singular forms "a", "said", and "the" used in the implementations of the present disclosure and the appended claims are also intended to include the plural forms unless the context clearly indicates other meanings.

For another example, depending on the context, the word "when" as used herein may be interpreted as "if" or "whether" or "while" or "in response to a determination of/that" or "in response to a detection of/that". Similarly, depending on the context, the phrase "if determining" or "if detecting (a stated condition or event)" may be interpreted as "when . . . is determined" or "in response to a determination" or "when (stated condition or event) is detected" or "in response to a detection of (stated condition or event)".

Those of ordinary skill in the art will recognize that the example elements and algorithm acts described in combination with the implementations disclosed herein can be implemented in electronic hardware, or a combination of computer software and electronic hardware. Whether these functions are implemented in hardware or software depends on the specific application and design constraints of the technical solution. One skilled in the art may use different methods to implement the described functions for each particular application, but such implementation should not be considered to be beyond the scope of implementations of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, devices and methods may be implemented in other ways. For example, the device implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Parts or all of the units can be selected according to actual needs to achieve the purpose of the implementations of the present disclosure.

In addition, various functional units in the implementations of the present disclosure may be integrated in one processing unit, or various units may be presented separately in a physical way, or two or more units may be integrated in one unit.

The function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or parts of the acts of the methods described in various implementations of the present disclosure. The aforementioned storage medium includes a medium capable of storing program codes, such as, a U disk, a mobile hard disk, a read-only memory (ROM), a magnetic disk or an optical disk, etc.

What are described above are merely the specific implementation modes of the implementations of the present disclosure, but the protection scope of the implementations of the present disclosure is not limited thereto. Any change or substation that can be easily conceived by a person skilled in the art within the technical scope disclosed by the implementations of the present disclosure shall be included within the protection scope of the implementations of the present disclosure. Therefore, the protection scope of the implementations of the present disclosure should be subject to the protection scope of the claims.

What is claimed is:

1. A method of measuring, applied to a 5G communication system, the method comprising:
   receiving, by a terminal device, measurement configuration information sent by a network device, wherein the measurement configuration information comprises configuration information of a plurality of transmission opportunities of a first reference signal on an unlicensed frequency band;
   receiving, by the terminal device, the first reference signal on the plurality of transmission opportunities and performing measurement on the first reference signal according to the configuration information;
   determining, by the terminal device, cell quality according to a measurement value of the first reference signal received on the plurality of transmission opportunities; and
   before receiving, by the terminal device, the measurement configuration information sent by the network device:
      receiving, by the terminal device, mapping relationship information sent by the network device, wherein the mapping relationship information comprises at least one reference signal type and information about a time window corresponding to the at least one reference signal type, and the at least one reference signal type comprises a type of the first reference signal; and
      determining, by the terminal device, a time window corresponding to the first reference signal according to the mapping relationship information and the type of the first reference signal;
   wherein receiving, by the terminal device, the first reference signal on the plurality of transmission opportunities and performing measurement on the first reference signal according to the configuration information comprises:
      receiving, by the terminal device, the first reference signal on the plurality of transmission opportunities within a time window corresponding to the first reference signal and performing measurement on the first reference signal according to the configuration information,
   wherein the information about the time window comprises at least one of a start position of the time window or an end position of the time window.

2. The method according to claim 1, wherein determining, by the terminal device, the cell quality according to the measurement value of the first reference signal received on the plurality of transmission opportunities, comprises:
   determining, by the terminal device, a measurement value of the first reference signal received on a second transmission opportunity as a measurement value of the first reference signal on a first transmission opportunity when the terminal device does not receive the first reference signal on the first transmission opportunity of the plurality of transmission opportunities, wherein the second transmission opportunity is before the first transmission opportunity.

3. The method according to claim 1, wherein the plurality of transmission opportunities belong to a same time window, and the configuration information comprises configuration information of the plurality of transmission opportunities within the time window.

4. The method according to claim 1, wherein the measurement configuration information comprises a plurality of offset values of a fixed time position;

wherein receiving, by the terminal device, the first reference signal on the plurality of transmission opportunities and performing measurement on the first reference signal according to the configuration information comprises:
receiving, by the terminal device, the first reference signal sent by the network device on the plurality of transmission opportunities determined according to the plurality of offset values.

5. The method according to claim 1, wherein receiving, by the terminal device, the measurement configuration information sent by the network device comprises:
receiving, by the terminal device, system information sent by the network device, wherein the system information comprises the measurement configuration information.

6. The method according to claim 1, wherein receiving, by the terminal device, the measurement configuration information sent by the network device comprises:
receiving, by the terminal device, radio resource control (RRC) signaling sent by the network device, wherein the RRC signaling comprises the measurement configuration information.

7. The method according to claim 1, wherein the first reference signal is a Synchronization Signal Block (SSB) or a Channel State Information Measurement Reference Signal (CSI-RS).

8. The method according to claim 1 wherein the method further comprises:
sending, by the terminal device, reporting information to the network device, wherein the reporting information comprises indication information and cell quality acquired by the terminal device based on the first reference signal, and the indication information is used for indicating that the cell quality reported by the terminal device is cell quality acquired after the terminal device takes missing of a sampling value into account.

9. The method according to claim 1, wherein determining, by the terminal device, the cell quality according to the measurement value of the first reference signal received on the plurality of transmission opportunities, comprises:
determining, by the terminal device, the cell quality according to the following formula:

$$F_n=(1-a)*F_{n-1}+aM_n$$

wherein n represents a number of samplings, $F_n$ represents cell quality, $M_n$ represents a measurement value, and a represents a weighting coefficient.

10. A terminal device, applied to a 5G communication system, the terminal device comprising:
a transceiver, configured to receive measurement configuration information sent by a network device, wherein the measurement configuration information comprises configuration information of a plurality of transmission opportunities of a first reference signal on an unlicensed frequency band; and
a processor, configured to control the transceiver to receive the first reference signal on the plurality of transmission opportunities and perform measurement on the first reference signal according to the configuration information, and further configured to determine cell quality according to a measurement value of the first reference signal received on the plurality of transmission opportunities;
wherein the transceiver is further configured to:
receive mapping relationship information sent by the network device before receiving the measurement configuration information sent by the network device, wherein the mapping relationship information comprises at least one reference signal type and information about a time window corresponding to the at least one reference signal type, and the at least one reference signal type comprises a type of the first reference signal;
wherein the processor is further configured to:
determine a time window corresponding to the first reference signal according to the mapping relationship information and the type of the first reference signal; and
control the transceiver to receive the first reference signal on the plurality of transmission opportunities within the time window corresponding to the first reference signal and perform measurement on the first reference signal according to the configuration information,
wherein the information about the time window comprises at least one of a start position of the time window or an end position of the time window.

11. The terminal device according to claim 10, wherein the processor is configured to:
determine a measurement value of the first reference signal received on a second transmission opportunity as a measurement value of the first reference signal on a first transmission opportunity when the first reference signal is not received on the first transmission opportunity of the plurality of transmission opportunities, wherein the second transmission opportunity is before the first transmission opportunity.

12. The terminal device according to claim 10, wherein the plurality of transmission opportunities belong to a same time window, and the configuration information comprises configuration information of the plurality of transmission opportunities within the time window.

13. The terminal device according to claim 10, wherein the measurement configuration information comprises a plurality of offset values of a fixed time position;
wherein the processor is further configured to:
control the transceiver to receive the first reference signal sent by the network device on the plurality of transmission opportunities determined according to the plurality of offset values.

14. The terminal device according to claim 10, wherein the transceiver is further configured to:
receive system information sent by the network device, wherein the system information comprises the measurement configuration information.

15. The terminal device according to claim 10, wherein the transceiver is further configured to:
receive Radio Resource Control (RRC) signaling sent by the network device, wherein the RRC signaling comprises the measurement configuration information.

16. The terminal device according to claim 10, wherein the first reference signal is a Synchronization Signal Block (SSB) or a Channel State Information Measurement Reference Signal (CSI-RS).

17. The terminal device according to claim 10, wherein the transceiver is further configured to:
send reporting information to the network device, wherein the reporting information comprises indication information and cell quality acquired by the terminal device based on the first reference signal, and the indication information is used for indicating that the cell quality reported by the terminal device is cell quality acquired after the terminal device takes missing of a sampling value into account.

18. The terminal device according to claim 10, wherein the processor is further configured to:
   determine the cell quality according to the following formula:

$$F_n = (1-a)*F_{n-1} + aM_n$$

wherein n represents a number of samplings, $F_n$ represents cell quality, $M_n$ represents a measurement value, and a represents a weighting coefficient.

* * * * *